UNITED STATES PATENT OFFICE.

GEORGE ALFRED LINDGREN, OF LA PORTE, INDIANA.

COMPOUND FOR PREVENTING WINDOW-FROST.

SPECIFICATION forming part of Letters Patent No. 341,757, dated May 11, 1886.

Application filed August 13, 1885. Serial No. 174,307. (No specimens.)

*To all whom it may concern:*

Be it known that I, GEORGE ALFRED LINDGREN, of the city and county of La Porte, and State of Indiana, have invented certain new and useful Improvements in Compounds for Preventing Window-Frost, of which the following is hereby declared to be a full, clear, and exact description, sufficient to enable others skilled in the art to make and use the same.

My invention relates to that class of compounds which may be applied to window-panes during cold weather to prevent the formation of frost thereon. Compounds of the character named are especially useful in application to the panes of bulk or show windows in shops, stores, hotels, and the like, which, by reason of their exposed position in severe winter weather, condense and congeal thereon the watery vapor suspended in the atmosphere of the store, shop, &c., so that the interior of the store or the contents of the window are no longer visible.

My invention consists of an improved compound, as hereinafter described, which may be applied to the window-pane exposed to the severe cold, and when so applied will prevent the accumulation thereon of the hoar-frost which ordinarily obscures the same.

In the practice of my invention I proceed as follows: Take of chloride of sodium one and one-half ounce; water, (pure,) three and one-fourth ounces; glycerine, seven and three-fourth ounces; isinglass, two and one-fourth ounces; cologne spirit, one ounce; sulphuric acid, one-half ounce.

The quantity of isinglass or like form of gelatine, as above named, is dissolved in the water at boiling temperature, after which the chloride of sodium is dissolved therein and the glycerine then added. The solution is allowed to cool, the cologne spirit being thereupon poured in and the mixture then exposed for about six hours to a temperature of ten degrees below zero centigrade, after which the sulphuric acid is stirred in and the compound is completed in readiness to apply.

A sponge or brush may be used to apply the compound to the surface of the window, which being coated therewith is shown by practice to be effectually protected from the formation of frost and ice thereon.

The coating can be renewed from time to time, and may be removed entirely at will by washing. It is colorless and transparent, so that the window having the compound coating thereon remains wholly unobscured.

Although the proportions, mode of manufacture, and ingredients heretofore stated are deemed by me to be the best for the purpose in view, it will be understood that changes may be made therein without departing from the spirit of my invention. Thus, for example, the admixture of the glycerine and isinglass, or like form of gelatine, make of themselves a useful composition for the purpose intended, and are deemed by me to be the main or essential elements of my composition.

Having thus described the invention, what I claim as new, and desire to secure by Letters Patent, is—

1. A compound for removing frost from window-panes and having glycerine and gelatine as ingredients thereof, substantially as described.

2. A compound for removing frost from window-panes, the same consisting of glycerine, isinglass, chloride of sodium, cologne spirit, sulphuric acid, and water, united in about the proportions substantially as herein specified.

GEORGE ALFRED LINDGREN.

Witnesses:
ED. C. ZABOT,
C. H. HUNTOON.